United States Patent
Hu et al.

(10) Patent No.: US 8,063,340 B2
(45) Date of Patent: Nov. 22, 2011

(54) METHOD FOR CONTROLLING THE CONSISTENCY OF AN ARC WELDING PROCESS BY MONITORING WELDING VOLTAGE TO DETERMINE WELD DROPLET DETACHMENT

(75) Inventors: Shixin Hu, Ann Arbor, MI (US); Wenkao Hou, Ypsilanti, MI (US); Hao Du, Ann Arbor, MI (US); Pei-Chung Wang, Troy, MI (US); Roland J. Menassa, Macomb, MI (US)

(73) Assignees: GM Global Technology Operations LLC, Detroit, MI (US); The Regents of the University of Michigan, Ann Arbor, MI (US)

( * ) Notice: Subject to any disclaimer, the term of this patent is extended or adjusted under 35 U.S.C. 154(b) by 973 days.

(21) Appl. No.: 12/018,918

(22) Filed: Jan. 24, 2008

(65) Prior Publication Data
US 2009/0188903 A1  Jul. 30, 2009

(51) Int. Cl.
*B23K 9/00* (2006.01)
*B23K 9/10* (2006.01)

(52) U.S. Cl. .......... 219/137 R; 219/130.21; 219/130.31; 219/130.5

(58) Field of Classification Search ............... 219/130.1, 219/130.01, 131.31, 130.4, 130.5, 137 R; 700/46, 56, 57
See application file for complete search history.

(56) References Cited

U.S. PATENT DOCUMENTS
5,281,791 A  *  1/1994  Tabata et al. ............. 219/130.51

FOREIGN PATENT DOCUMENTS
JP  62151272 A  *  7/1987
WO  WO 03082508 A2  *  10/2003

* cited by examiner

*Primary Examiner* — Stephen Ralis

(57) ABSTRACT

A method is provided for monitoring and controlling the process consistency of an arc welding process. The weld voltage signal is monitored and analyzed to determine the occurrence of the detachment of a weld droplet. The weld droplet detachment is determined via statistical techniques as having occurred at a normal interval following a prior detachment indicating consistent weld process or as a sporadic detachment having occurred at an irregular interval with respect to the prior detachment and indicating inconsistent weld process. The weld process is adjusted by controlling the weld process variables to maximize the predominance of droplet detachment at normal intervals and minimize the occurrence of the sporadic detachments.

4 Claims, 4 Drawing Sheets

METHOD FOR CONTROLLING THE CONSISTENCY OF AN ARC WELDING PROCESS BY MONITORING WELDING VOLTAGE TO DETERMINE WELD DROPLET DETACHMENT

FIELD OF THE INVENTION

The present invention relates to a method for maintaining process consistency in arc welding and more particularly to the monitoring of weld voltage and control of weld process variables in response to analysis of the weld voltage.

BACKGROUND OF THE INVENTION

Aluminum is an important alternative material to steels for the automotive and other industries due to its superior strength-to-weight ratio. One of the most common joining processes for aluminum is gas metal arc welding (GMAW). In GMAW an electrode creates an arc, and a continuously fed wire electrode is melted by the arc and transferred to the welding pool between the two aluminum workpieces.

Compared to other joining processes, GMAW has many advantages in achieving quality of weld joints and efficiency of production. However, GMAW is a very complicated process involving mechanical, electrical, thermal, chemical and metallurgical phenomena. Thus it can be challenging to maintain stability.

Furthermore, aluminum is much more difficult to weld than steel and is more likely to have weld discrepancies compared to steels. For example, compared to steels, aluminum has higher thermal conductivity, higher rate of thermal expansion and higher solidification shrinkage, thus requiring more intense and tighter controls of heat input. Aluminum also has much higher hydrogen solubility, which results in higher sensitivity to the shielding gas.

In order to ensure GMAW process consistency and weld quality, when welding aluminum as well as other metals, it would be desirable to develop improved on-line weld monitoring methods by which the available process data, such as weld voltage, could be evaluated in a manner that process instability and weld discrepancies could be detected quickly, thus enabling prompt adjustment of weld variables such as arc length, wire feed rate, shielding gas composition and flow rate, welding power source characteristics, in order to bring the welding process back into proper consistency and quality.

SUMMARY OF THE INVENTION

A method is provided for monitoring and controlling the process consistency of an arc welding process. The weld voltage signal is monitored and analyzed to determine the occurrence of the detachment of a weld droplet. The weld droplet detachment is determined via statistical techniques as having occurred at a normal interval following a prior detachment indicating consistent weld process or as a sporadic detachment having occurred at an irregular interval with respect to the prior detachment and indicating inconsistent weld process. The weld process is adjusted by controlling the weld process variables to maximize the predominance of droplet detachment at normal intervals and minimize the occurrence of the sporadic detachments.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
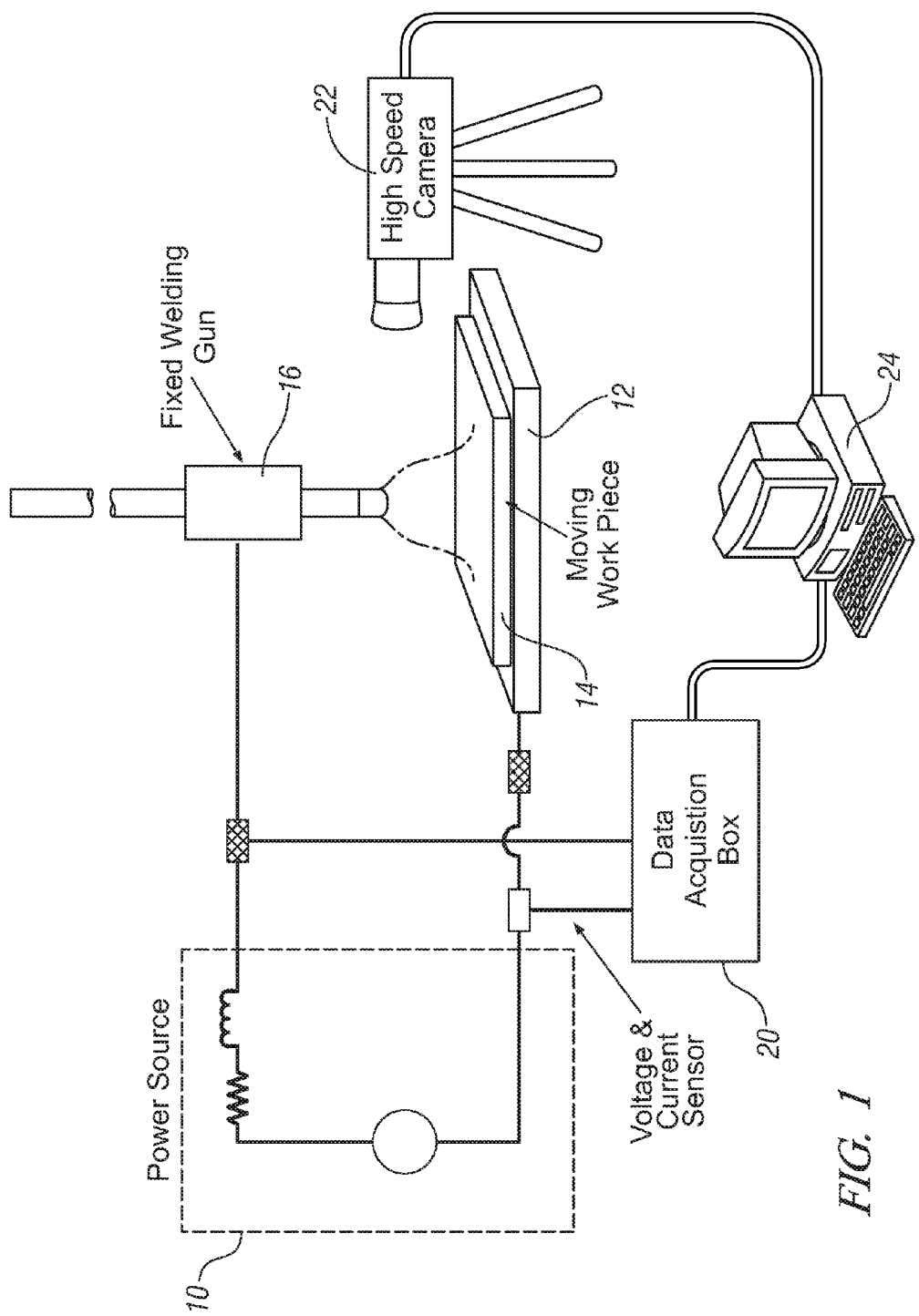
FIG. 1 is a schematic illustration of instrumentation used in the conduct of experimental observations.

FIG. 1 shows system instrumentation by which experiments are conducted to characterize the welding process under various conditions and identify the correlation between the welding process and monitored signals such as welding voltage and current. A Power Wave 455 welding machine 10 from Lincoln Electric Co. is used as the welding power source. A moving table 12 is used to control the movement of the aluminum workpieces 14 relative to the fixed welding gun 16. A data acquisition system 20 from Impact Engineering, ARCAGENT, is used to collect data such as the welding current, voltage and wire feed rate during welding. A Kodak Motion Analyzer System 22 is used to obtain high speed images of the welding process. Using this instrumentation, the welding data signals are acquired at a rate of 5000 Hz and high speed images at 1000 frames/sec. To protect the CCD sensor in the Motion Analyzer camera, the welding arc is properly filtered without losing the resolution and details of the images.

With the above instrumented system, the welding signals and high speed images were taken into computer 24 simultaneously during welding experiments under different welding conditions, using the welding parameters listed in Table 1.

TABLE 1

| Experimental Parameters. | |
|---|---|
| Material | Al 6061 |
| Shielding Gas | 100% Argon |
| Wire Diameter | 1.6 mm |
| CTTD | 18 mm |
| Voltage | 22 V |
| Plate Thickness | 5.8 mm |
| Gun Angle | 90° |
| Wire Feed Rate | 160 inch/min |

Figure 2:
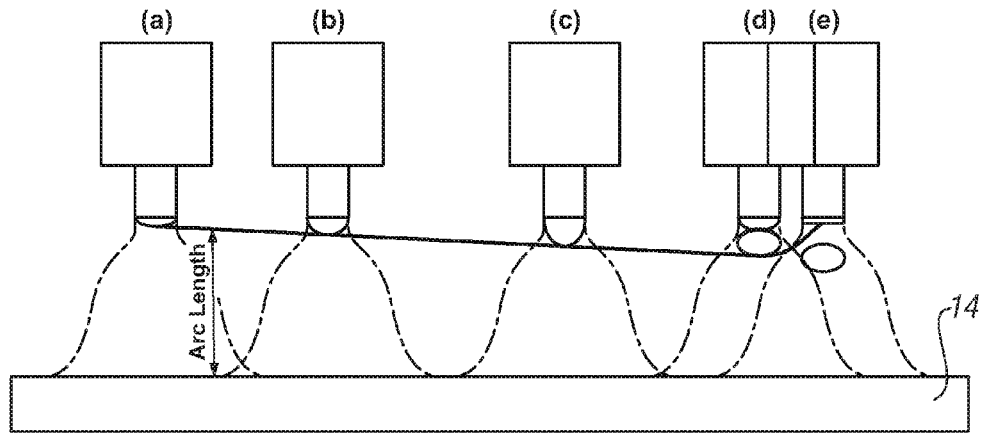
FIG. 2 is a schematic illustrating the progression of weld droplet growth and detachment.
Figure 3:
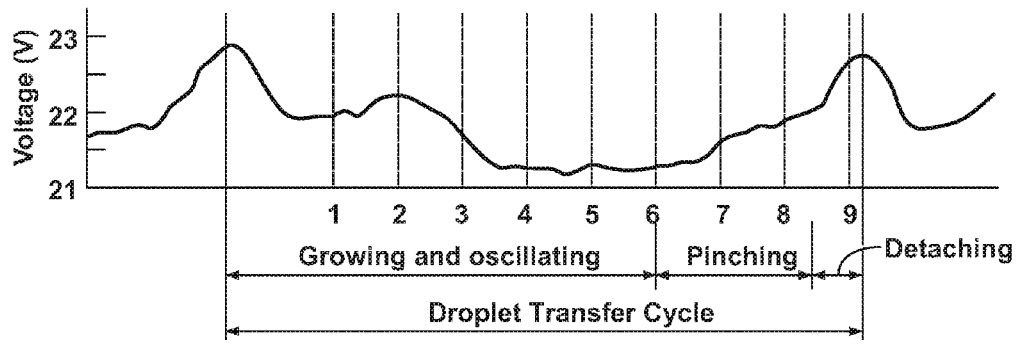
FIG. 3 is a plot of weld voltage during the growth and detachment of weld droplet.

By analyzing the high speed images, it is observed that the droplet transfer process progresses in a repeatable manner as the droplets are grown, pinched and detached. FIG. 2 shows this progression of weld droplet transfer. In FIG. 2a, the droplet is beginning to form as the weld wire is fed through the weld torch. In FIG. 2b, the droplet is growing. In FIG. 2c the droplet is growing to full volume, oscillating in shape due to the actions of the surface tension of the molten droplet and other forces, and beginning to pinch. FIG. 2d shows the droplet detaching from the electrode. FIG. 2e shows the detached droplet descending to the workpieces 14. FIG. 2 also shows that the arc length is progressively shortened during the droplet transfer process from FIGS. 2a-2d, and then the arc length is dramatically increased as the droplet detaches at FIG. 2e From the analysis of the voltage and current signals and the corresponding high speed images, it is observed that there is a recurring pattern in the voltage signal and weld droplet transfer process. In particular, as seen In FIG. 3, a spike in the voltage signal corresponds exactly to the occurrence of a droplet detachment. This phenomenon is logical in that there is a sudden increase in the arc length as soon as the droplet is detached. And since arc voltage is proportional to arc length, this sudden change causes a sharp increase in the voltage signal. Due to the arc characteristics and the voltage constancy which is governed by the welding power source, the increased voltage is quickly adjusted back to the previous level. The sudden increase and decrease in voltage thus forms a spike which indicates the instant of droplet detachment. As shown in FIG. 3, a droplet transfer cycle is defined as the time period between the peaks of two consecutive spikes. Since the electrode wire is fed at a constant rate, the length of the transfer cycle is positively correlated to the size of the droplet.

Figure 4:
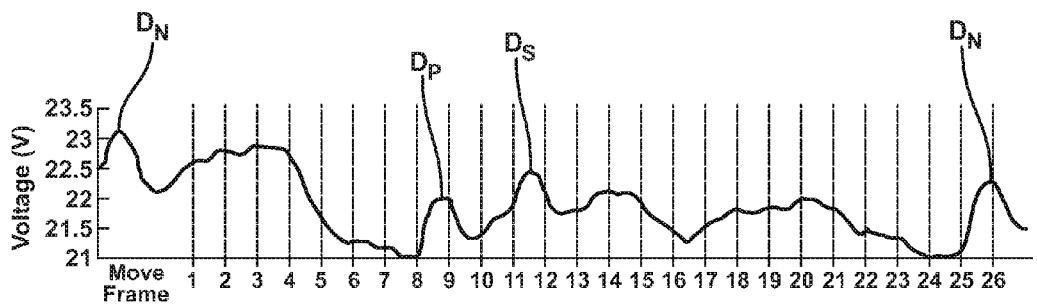
FIG. 4 is a plot of weld voltage over time and showing the occurrence of normal droplets as well as irregular primary and secondary droplets; and, FIG. 5 is a flow chart of the method and algorithm of the invention.

In observing the correlation between voltage and droplet detachment, it can also be observed that sometimes there are one or two droplets with relatively small size detached immediately after a preceding "normal droplet" Dn. Referring to FIG. 4, such a small size droplet is designated as a "secondary droplet", Ds, and follows soon after a "primary droplet", Dp. FIG. 4 also shows that the cycle time of a secondary droplet Ds is much shorter than that of a normal droplet Dn. However, the occurrence of these primary and secondary droplets will appear sporadically.

By further analysis of the weld voltage and the high speed images, as well as observing the stability of the process, it can be observed that the irregular droplet sizes and transfer frequencies of the primary droplets Dp and the secondary droplets Ds correspond to uneven distribution of molten filler material, and in turn correlate with inconsistent weld penetration and weld appearance.

Thus, in order to assure consistent weld penetration and weld appearance, it is desirable to control the welding variables such as wire feed rate and voltage in a manner to maintain a predominance of normal droplets, Dn, while minimizing the occurrence of sporadic primary and secondary droplets Dp and Ds.

Figure 5:
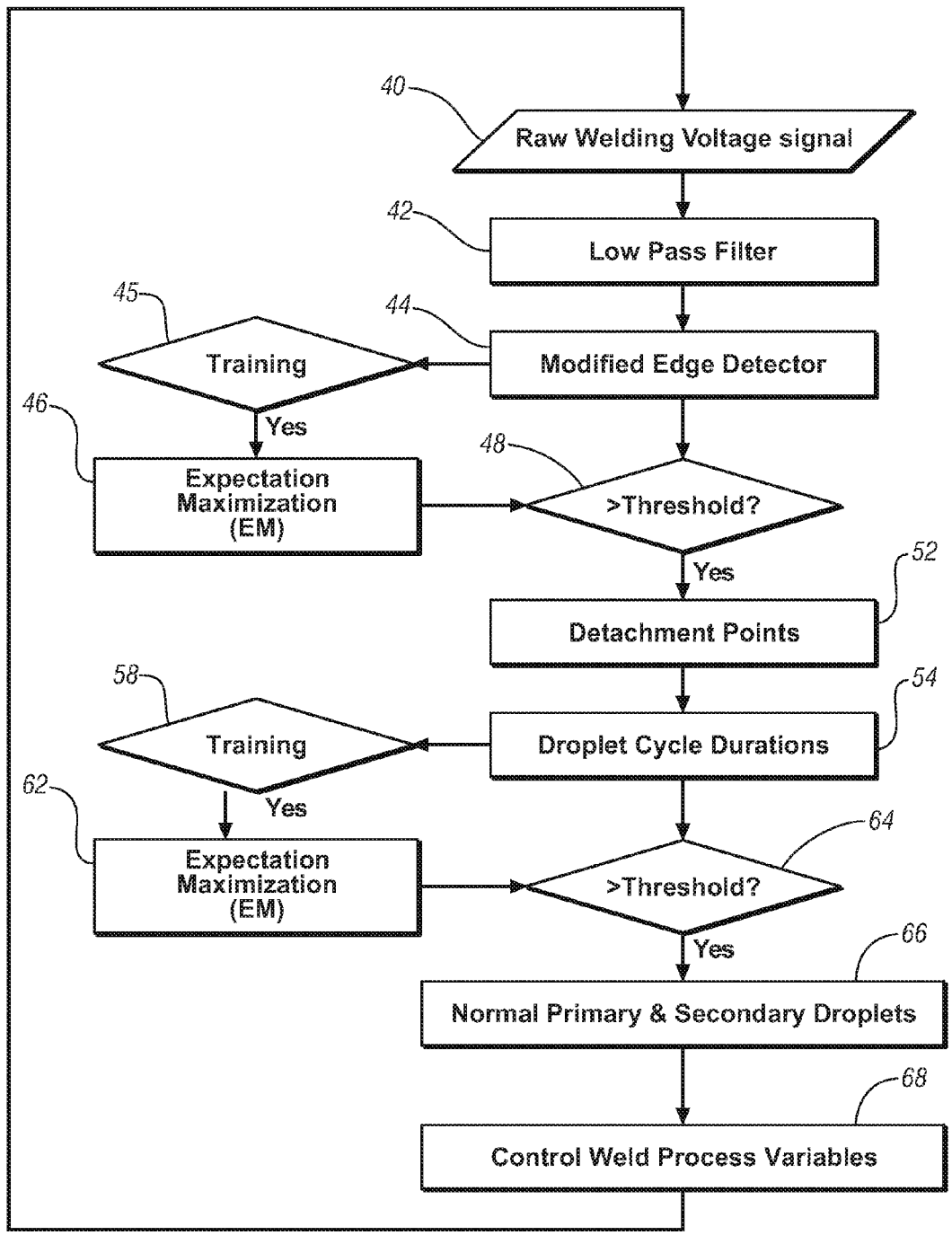

Accordingly, an algorithm has been developed to automatically detect the detachment peaks and classify the droplets as either normal, primary or secondary under various welding conditions by referring to the welding voltage and without referring to the high speed images. FIG. 5 is a flow chart for such an algorithm. Once the droplets are classified, the welding variables can be adjusted to maintain a predominance of normal droplets and minimize the occurrence of sporadic primary and secondary droplets, thereby assuring consistent weld penetration and weld appearance.

Referring to FIG. 5, at step first 40, the raw welding voltage is obtained and the raw voltage signals are passed through a low pass filter 42, such as 400 Hz pass band, to eliminate high frequency noise.

The next step is to analyze the voltage spikes in order to identify the detachment points. However, even after the use of a filter to eliminate the noise, the magnitudes of the voltage spikes, can vary substantially, even between normal droplets. Thus it may be difficult to detect the detachment spikes since the spikes sometimes are concealed by other voltage fluctuations caused by a complex combination of variables such as arc length, wire feed rate, shielding gas composition and flow rate, welding power source characteristics, and unexpected ambient disturbances. Although the magnitude of the detachment peaks vary dramatically during welding, it is observed that the slope of the detachment peaks is generally greater than the slope of the other intervening voltage fluctuations.

Accordingly, the filtered voltage will be passed through a so called modified edge detector 44 so that the peaks will stand out more:

$$Y_i = X_i - X_{i-2} - X_{i-4} + X_{i-6}$$

where Xi is the voltage magnitude of sample i, and Yi is the discriminant. The sample frequency may be 5 kHz. The modified edge detector algorithm is well known in the field of statistical computing. The modified edge detector, with appropriate training at step 45 thus serves a discriminant function, and magnifies and discriminates droplet detachment peaks from unpredicted fluctuations in voltage signals. The discriminants follow three distributions Np+, Np−, and No. Distributions Np+ and Np− correspond to the sudden increase/decrease before/after the droplet detachment point. Distribution No corresponds to the unpredicted fluctuations which has low frequency and has not been magnified by the modified edge detector.

Based on the observation that the discriminants follow the distributions of Np+, Np− and No, an Expectation Maximization (EM) algorithm is performed at step 46 to fit the three normal distributions and find the optimal threshold to discriminate each distribution with minimal misclassification error. The Expectation Maximization algorithm is frequently used for data clustering in machine learning and computer vision fields and as such is well known. The threshold, step 48 will be used to determine if a discriminant Yi indicates a droplet detachment or not. Since the modified edge detector introduces a lag between discriminants Yi and voltage signal Xi, a local maximum search will be performed between Xi−5 and Xi+5 at step 52 to find the exact detachment point.

Since a droplet cycle is defined as the time period between consecutive two droplets, it can be easily calculated at step 54 given the determination of the successive droplet detachment points at step 52. Experiments also show that the cycle durations of the normal, primary and secondary droplets follow three normal distributions Nn, Np and Ns respectively, then a droplet can be classified accordingly by the length of its cycle duration.

Figure 6:
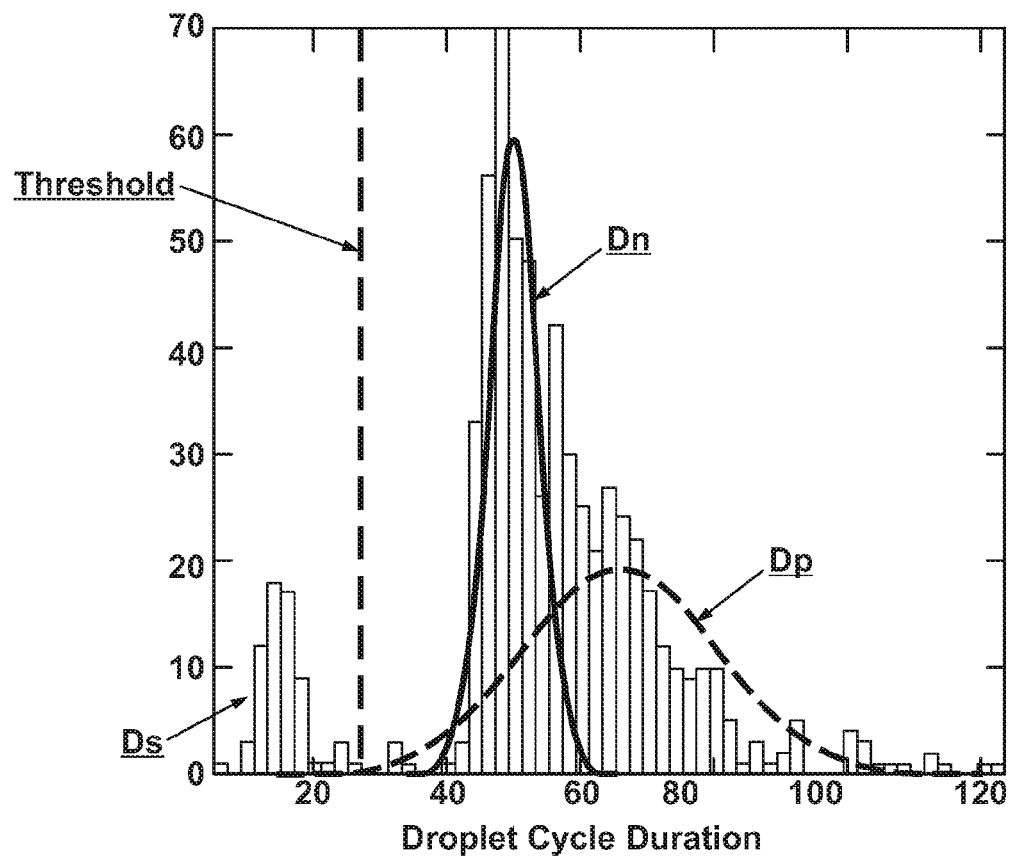

With training at step 58, the expectation maximization method is then used again at step 62 to fit three distributions Nn, Np and Ns which are corresponding to the normal, primary and secondary droplet cycle duration distributions respectively. Thereafter a threshold is obtained at 64 to discriminate secondary droplets from the normal and primary droplets with minimal misclassification error, at step 66, as shown in FIG. 6. Given that a primary droplet is always followed by a secondary droplet, it is straightforward to identify the primary droplet after recognizing a secondary droplet.

At step 68, the weld process is controlled by promptly adjusting one or more of the weld variables such as arc length, wire feed rate, shielding gas composition and flow rate, welding power source characteristics, in order to bring the welding process back into the desired consistency and quality.

Thus, the foregoing algorithm and method will automatically detect the detachment peaks and classify the droplets as either normal, primary or secondary under various welding conditions by referring to the welding voltage. The welding variables can be adjusted to maintain a predominance of normal droplets and minimize the occurrence of sporadic primary and secondary droplets, thereby assuring consistent weld penetration and weld appearance. The process and algorithm are performed without referring to the high speed images and without the need to conduct off-line inspection of samples of the welded workpieces.

What is claimed is:

1. A method for monitoring and controlling a process stability of a weld process in which weld wire is fed through an electrode at a wire feed rate, a shielding gas is provided at a flow rate, and a voltage signal is applied to the electrode to create an arc and detach weld droplets from the weld wire comprising:

monitoring the weld process by measuring the voltage signal and passing only the measured voltage signal through a filter to eliminate noise;

analyzing the measured and filtered voltage signal to determine an occurrence of a voltage peak;

further analyzing the measured and filtered voltage signal to distinguish between a voltage peak caused by a weld droplet detachment detaching from the weld wire and a voltage peak of a spurious voltage fluctuation caused by other factors than a the weld droplet detaching from the weld wire, said further analyzing including plotting the voltage peaks and identifying those voltage peaks that have the generally greater slope as being the voltage peaks caused by the weld droplet detaching from the weld wire;

classifying each weld droplet detachment as having occurred at the normal interval following the prior weld droplet detachment or as the sporadic weld droplet detachment having occurred at an irregular interval with respect to the prior weld droplet detachment;

and controlling the weld process by adjusting at least one of the wire feed rate of the weld wire, the flow rate of the shielding gas, and the voltage signal applied to the electrode, to maximize a predominance of the weld droplet detachments at normal intervals and minimize the occurrence of the sporadic weld droplet detachments occurring at the irregular interval with respect to the prior weld droplet detachment.

2. The method of claim 1 further characterized by using a modified edge detector algorithm to further discriminate the measured and filtered voltage peaks caused by the weld droplet detachment from the measured and filtered voltage peaks caused by the other factors.

3. The method of claim 1 further comprising using an expectation maximization to classify the each weld droplet detachment as having occurred at the normal interval following the prior weld droplet detachment or as the sporadic weld droplet detachment having occurred at the irregular interval with respect to the prior weld droplet detachment.

4. The method of claim 1 further comprising using statistical techniques including a modified edge detector algorithm to further discriminate the measured and filtered voltage peaks caused by the weld droplet detachment from voltage peaks caused by the other factors and an expectation maximization to classify the each weld droplet detachment as having occurred at the normal interval following the prior weld droplet detachment or as the sporadic weld droplet detachment having occurred at an irregular interval with respect to the prior weld droplet detachment.

* * * * *